(12) United States Patent
Wells et al.

(10) Patent No.: US 8,353,970 B2
(45) Date of Patent: Jan. 15, 2013

(54) METHOD OF ASSEMBLING ELECTRIC STORAGE BATTERY PACKS

(75) Inventors: Jeffrey R. Wells, Orion, MI (US);
Stephanie L. Corker, Waterford, MI (US); Robert H. Dietze, Brighton, MI (US); Michael M. Arvaneh, Grand Blanc, MI (US); Gene P. Emmerich, Commerce Township, MI (US); John D. Tompkins, Troy, MI (US); Edward S. Turvene, Grand Blanc, MI (US); William O. Merkle, Macomb, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 414 days.

(21) Appl. No.: 12/764,316

(22) Filed: Apr. 21, 2010

(65) Prior Publication Data
US 2011/0258845 A1    Oct. 27, 2011

(51) Int. Cl.
*H01M 2/00* (2006.01)
*H01M 2/10* (2006.01)
*H01M 2/22* (2006.01)
*H01M 6/42* (2006.01)
*H01M 10/48* (2006.01)

(52) U.S. Cl. ....... 29/623.1; 429/153; 429/151; 429/186; 429/99; 429/90; 429/148

(58) Field of Classification Search .............. 29/623.1, 29/623.5; 429/90, 153, 99, 148, 151, 186; 118/315; 156/566; 324/425
See application file for complete search history.

(56) References Cited

U.S. PATENT DOCUMENTS

| | | | | |
|---|---|---|---|---|
| 1,643,949 A | * | 10/1927 | Kyle | 324/425 |
| 3,627,617 A | * | 12/1971 | Schaumburg et al. | 156/566 |
| 3,629,010 A | * | 12/1971 | Hahn | 118/315 |
| 5,663,007 A | * | 9/1997 | Ikoma et al. | 429/53 |
| 2003/0113617 A1 | * | 6/2003 | Gaignerot et al. | 429/99 |
| 2007/0180690 A1 | * | 8/2007 | Dixon et al. | 29/730 |

* cited by examiner

*Primary Examiner* — Jonathan Crepeau
*Assistant Examiner* — Kenneth Douyette

(57) ABSTRACT

A method of assembling a battery assembly includes forming battery packs, each pack including battery cells and cooling passages extending along a length of the pack, connecting terminals of each pack to a dc source and charging each pack to a desired state of charge, installing battery packs on a tray located on an automatically guided cart, using the cart to carry the battery assembly to locations where method steps are performed including performing testing for fluid leaks in a cooling circuit comprising interconnected passages of each pack on the tray and installing electric circuits in the assembly.

18 Claims, 4 Drawing Sheets

METHOD OF ASSEMBLING ELECTRIC STORAGE BATTERY PACKS

BACKGROUND OF INVENTION

The present invention relates generally to the module of a complete battery pack in a vehicle whose propulsion system is at least partly electric powered.

A rechargeable electric storage battery is mounted on a tray located at the underside of a vehicle with its lower surface exposed to the road. It has been conventional practice to form such battery trays in multiple pieces of high strength material such as multiple stampings that are welded together. The lower surface of the tray is covered with a panel.

A battery tray casting in one-piece would reduce overall complexity of a battery tray formed of multiple welded stampings.

A need exists in the industry for a method for assembling battery packs for automotive and other applications using a tray formed in a single piece and multiple battery packs supported on the tray. Preferably the battery tray would minimize the number of required fasteners and eliminate or avoid tooling required during vehicle and component assembly to accommodate a multi-piece battery tray.

SUMMARY OF INVENTION

A method of assembling a battery assembly includes forming battery packs, each pack including battery cells and cooling passages extending along a length of the pack, connecting terminals of each pack to a dc source and charging each pack to a desired state of charge, installing battery packs on a tray located on an automatically guided cart, using the cart to carry the battery assembly to locations where method steps are performed including performing testing for fluid leaks in a cooling circuit comprising interconnected passages of each pack on the tray and installing electric circuits in the assembly.

The tray insulates the batteries against harm due to the ambient air temperature in the operating environment.

The tray, preferably formed in one-piece of sheet metal with multiple reinforcement bars, minimizes aerodynamic drag by using a cover.

The one piece design minimizes mass and the number of fasteners. Because tooling normally used to accommodate a multi-piece design is not required during vehicle module and component module assembly, the tray design minimizes piece cost and requires low investment cost and reduces tooling lead time.

The ribs enable the structural, impact, and durability requirements of the tray to be realized.

The scope of applicability of the preferred embodiment will become apparent from the following detailed description, claims and drawings. It should be understood, that the description and specific examples, although indicating preferred embodiments of the invention, are given by way of illustration only. Various changes and modifications to the described embodiments and examples will become apparent to those skilled in the art.

DETAILED DESCRIPTION

Figure 1:
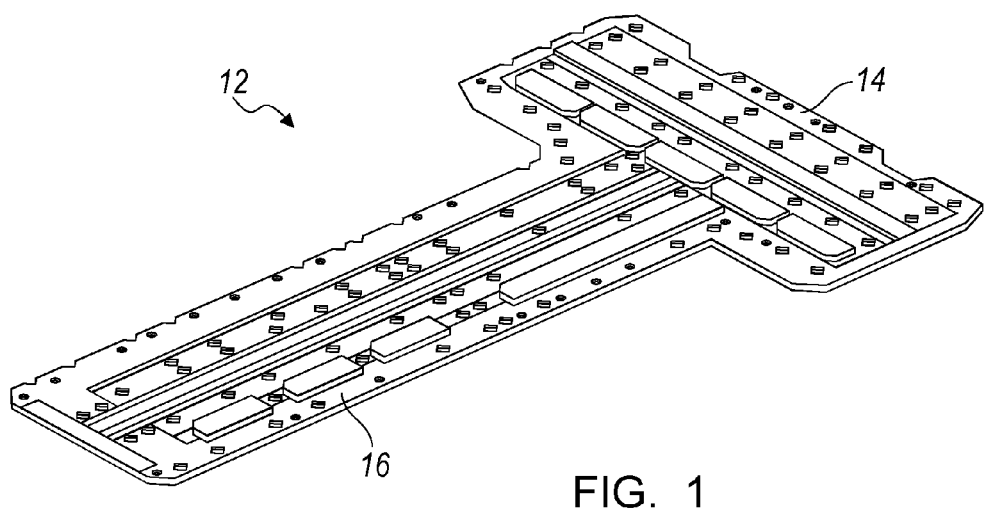
FIG. 1 is a perspective view of a battery tray.

Referring now to the drawings of the components of an electric storage battery assembly 10, FIG. 1 illustrates a battery support tray 12, which is preferably of sheet metal. When viewed from above, the tray 12 is tee-shaped having a cross leg 14 and a longitudinal leg 16.

A battery unit comprises three packs. In addition to the 72-section pack 18 and a 90-section pack 20 shown in FIG. 2, the battery includes a 126-section pack. Each battery pack is formed with integral fluid cooling passages 19, 21, each passage extending along the length of the battery pack and located on opposite lateral sides of the battery cells 25. The fluid cooling passages 19, 21 of each battery section are connected to the corresponding passages of an adjacent battery section or to another portion of a cooling circuit by hoses and tubes 22, 24.

Each battery pack includes multiple voltage temperature sub-modules (VTSM) stacked along a length of the battery pack, each module comprising a battery cell 25, replacement frame, jacket and foam. Each VTSM has a positive tab and a negative tab. The tabs of adjacent VTSMs are welded together such that the modules of a fully charged battery pack produce an output voltage of about 40 to 50 volts. Preferably, the cells contain the battery electrolyte, lithium ions, in the form of a gel.

Figure 2:
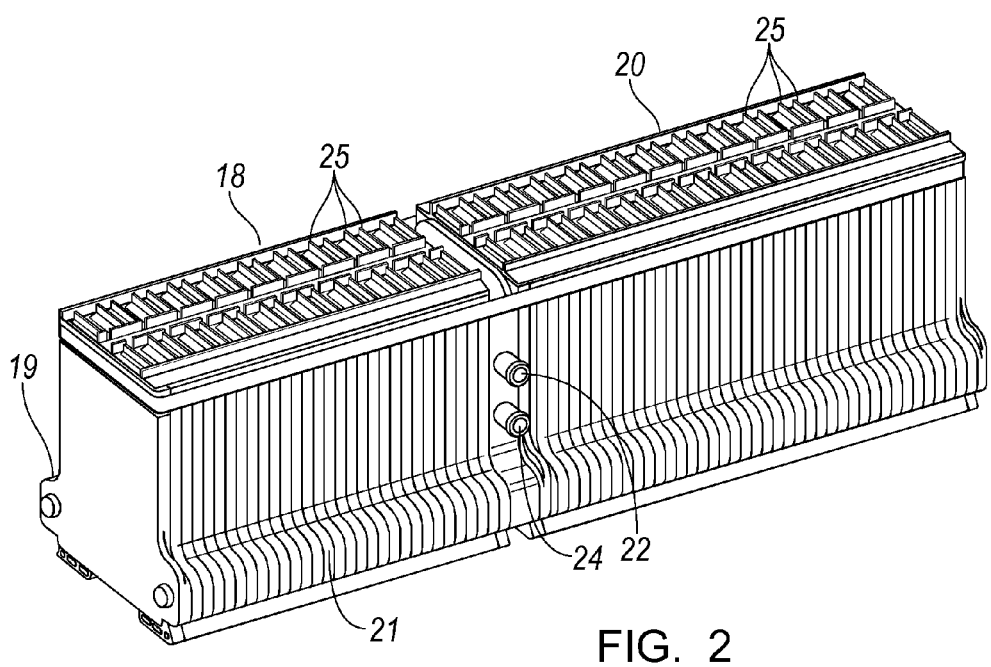
FIG. 2 is perspective view showing two aligned battery packs as they are assembled on the vertical leg of the tray.

Referring to FIGS. 1 and 2, the longitudinal leg 16 of tray 12 supports the battery sections 18, 20, which comprise 72 cells and 90 cells, respectively. The third battery pack (not shown) having 126 cells is supported on the cross leg 14 of tray 12.

Figure 3:
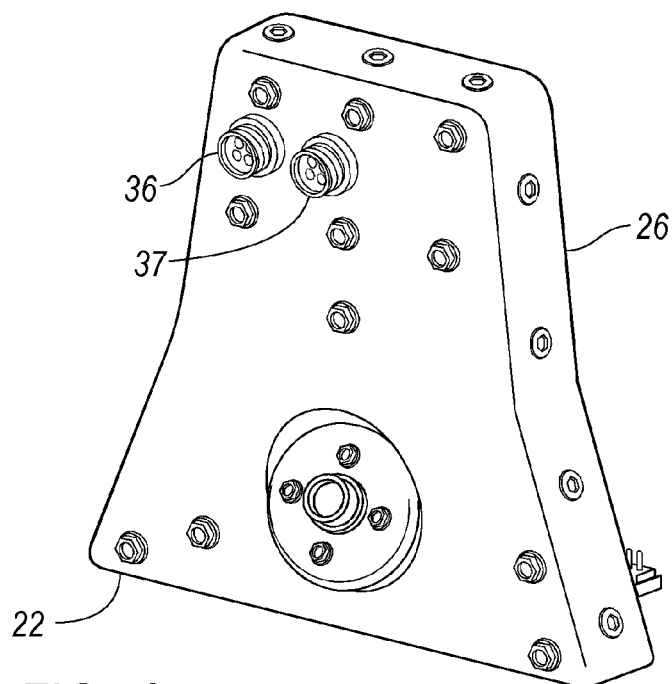
FIG. 3 is a perspective view of a bulkhead.
Figure 4:
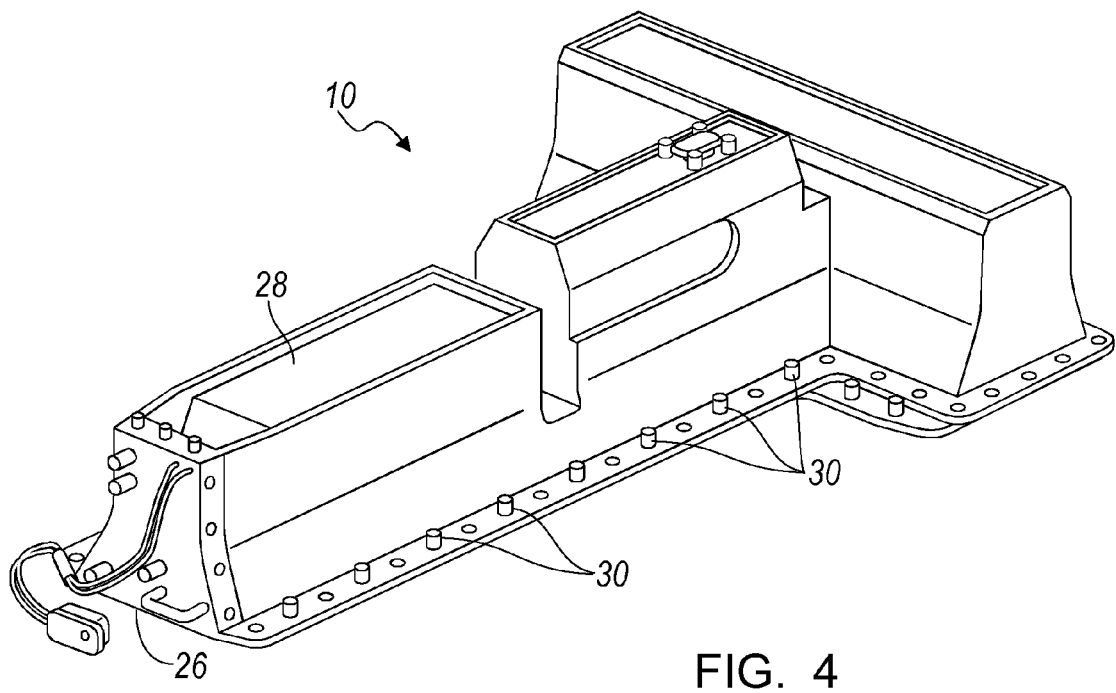
FIG. 4 is a perspective view of the completed module showing a cover secured to the tray.

The bulkhead 26, shown in FIG. 3 is secured by about 7 screws or bolts to a cover 28, which encloses the battery assembly 10, as shown in FIG. 4. The ends of the cooling tubes 22, 24 extend through the thickness of bulkhead 26 so that the coolant, a 50 percent mixture of de-ionized water and glycol, can circulate through the battery packs. Fastening strips (not shown) secure a lateral edge of each battery pack to the tray 12. Screws or bolts secure the fastening strips to the tray 12. The cover 28 is secured by about forty-nine screws 30 to the tray 12.

The overall length of the tray is about 1638 mm. The width of the cross leg 14 is about 937 mm. The width of the longitudinal leg 14 is about 395 mm. The thickness of the tray 12 is about 2 mm.

Figure 5:
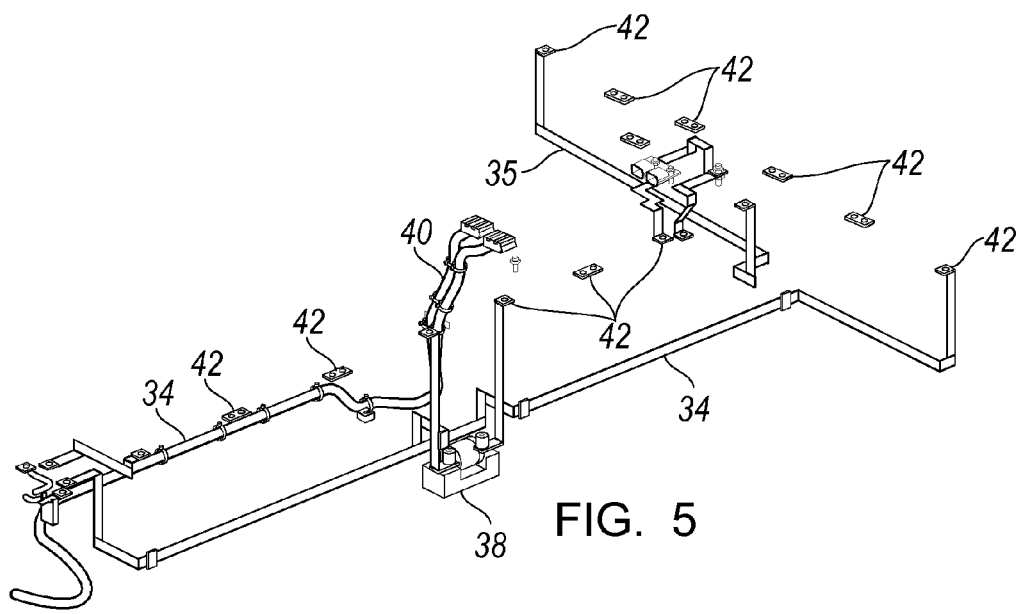
FIG. 5 is a perspective view showing bus bars and a mid-pack fuse of the battery pack assembly.

FIG. 5 shows high voltage positive polarity bus bars 34 and negative polarity bus bars 35, which carry electric current between the battery packs and terminals 36, 37 located on bulkhead 26 (shown in FIG. 3); a removable mid-pack fuse 38 of a manual service disconnect module (MSM); low voltage cables 40; and connector clips 42, which engage the battery cells. The MDM is located in the vehicle console such that the fuse 38 can be removed from the power supply circuit, thereby disconnecting the electric power source from the vehicle's electrical circuit.

Figure 6:
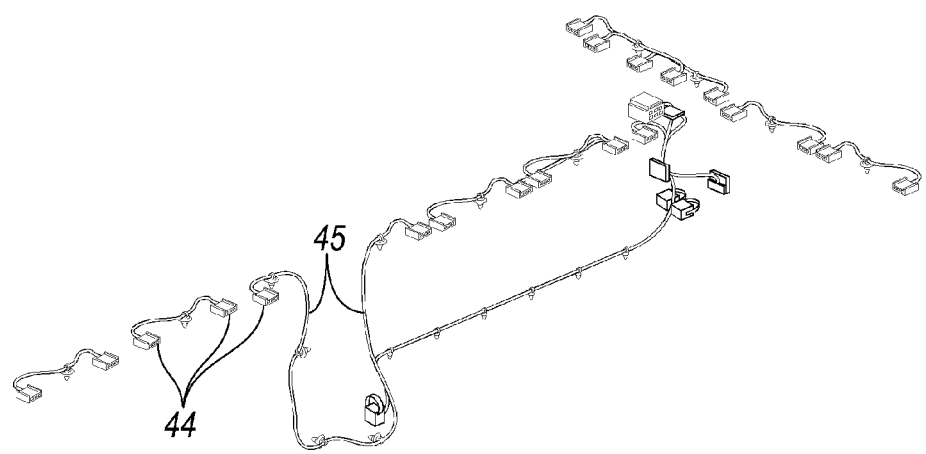
FIG. 6 is a perspective view showing VTSM plug connectors of the battery pack assembly.

The battery assembly includes three electrically interconnected circuit boards: a voltage, temperature, sensing module (VTSM) located on the top of the battery; a voltage, current, temperature module (VITM) located on the BDU; and a voltage, current, control module (VICM) located in the vehicle. FIG. 6 shows an arrangement of plugs 44 and wiring 45 that connect to PCBs of a battery controller, which continually monitors the battery's output, charging rate, draw rate, state of charge and other variables.

Figure 7:
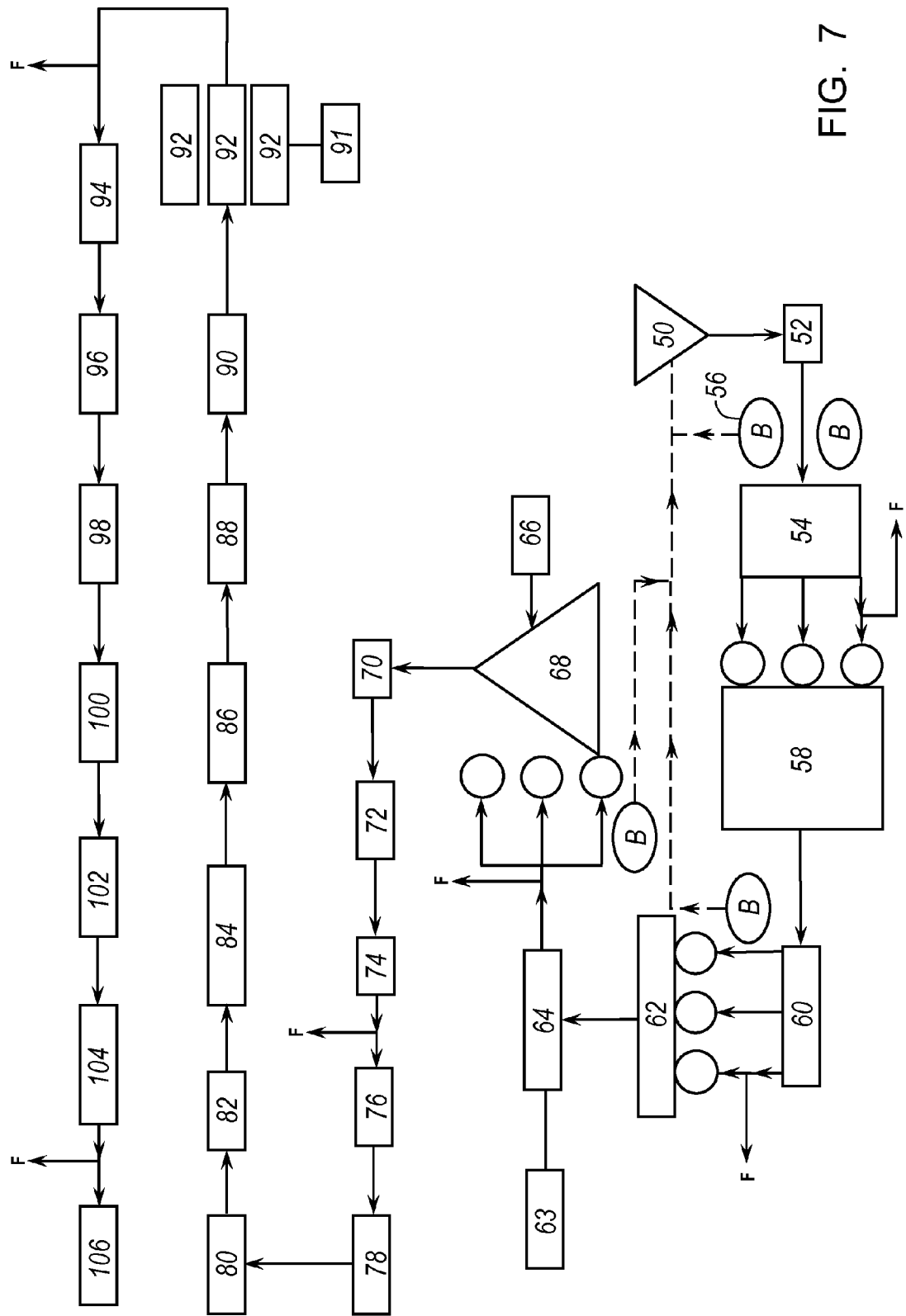
FIG. 7 is a diagram showing the assembly steps in substantially chronological order.

FIG. 7 illustrates the steps for assembling and testing the components of the battery assembly 10 in substantially chronological order. At step 50, the assembly process begins with the delivery of the three battery packs 18, 20 (the first two shown in FIG. 2), each battery pack assembled with the cells 25 and cooling passages 19, 21 in place.

At step 52, section stack, barcodes representing the serial numbers of battery pack components are applied to the battery packs 18, 20.

At step 54, section leak test, the fluid cooling circuit of each battery pack is leak tested. Rejected parts that fail (F) the test are banked (B) at 56 for subsequent repair and potential return to the process at step 50.

At step 58, interconnect board install, electrically interconnected VTSM boards are installed in the battery assembly.

At step 60, welding/verify, quality of the welds that join the tabs of the battery cells is verified and a buffer zone is provided. Any that fail (F) are banked (B) for subsequent repair.

At step 62, the terminals of each battery pack 18, 20 are connected through a charger to a source of dc electric power, whereby the storage cells of each battery pack are charged with electric current to a predetermined state of charge.

At step 64, pack module test, an electrical load test of each battery pack is performed to verify the state of charge. Data may be collected, step 63, at this point in the assembly process. Such data may include added charge, date/time stamp, and the charger number.

At step 66, the tray 12 is loaded onto an automated guiding cart (ACG), an unmanned cart having a control system that guides the steering of the ACG such that the cart follows a predefined path on the factory floor between work stations where assembly steps are performed. The path is defined by magnets placed on the floor, and the battery assembly is carried on the ACG between the work stations instead of on a conveyor belt.

At step 68, the three battery packs 18, 20 are loaded on and secured to the tray 12, which is now supported on and carried by the ACG.

At step 70, an ACG loop starts by installing and securing the bulkhead 26 to the tray at the lower end of the battery packs 18, 20 on the tray's longitudinal leg 16.

At step 72, all cooling fluid hoses and tubes 22, 24 are installed and interconnected to the fluid passages 19, 21 of the battery packs.

At step 74, the fluid cooling circuit is leak tested. Rejected circuits that fail (F) the test are removed for subsequent repair and are replaced.

At step 76, the cover 28 is secured to the tray 12, either using bolts or screws or a snap-on technique that requires no removable fasteners.

At step 78, the VTSM is installed and scanned after its installation.

At step 80, the low voltage cable 40 is routed through the battery assembly 10.

At step 82, the mid-pack fuse 38 is installed.

At step 84, a service disconnect (MSD) housing and bracket are installed. The MSD housing comprises two plastic housing parts, which contain a large fuse, from which positive and negative polarity wires extend through the housing to the vehicle's electric circuit.

At step 86, an electrical connection of the VTSM interconnect board to the battery assembly 10 is completed manually.

At step 88, small bus bars are installed, and at step 90, the bus bars 34, 35 are installed.

At step 92, electrical tests of each of the three battery packs are conducted after an operator makes connections at the front of bulkhead 26. Rejected parts that fail (F) the test are removed for subsequent repair and are replaced. Data may be collected, step 91, at this point in the assembly process. Such data may include VITM and VTSM's number, electronic part numbers, and a part number may be assigned to create a bar code.

Preferably no fluid leak testing is performed at the battery plant. Instead at step 94, the cooling system of the battery pack is tested for leaks using a technique called air mass flow differential leak testing, with fluid fill if required.

At step 96, a closeout cover install/service disconnect housing is attached manually to cover 28, and leak detection of the cover-tray-BDU interface is performed using a helium spectrometer.

At step 98, a pressure decay test is performed on the cooling circuit. Rejected parts that fail the test are removed for subsequent repair and are replaced.

At step 100, a crossbar (not shown), which is installed manually to the top battery assembly 10, facilitates installing and securing the assembly 10 to a bracket on the vehicle chassis.

At step 102, barcodes and labels are applied to the exterior of the cover 28 of the battery assembly 10.

At step 104, a final quality inspection is performed. Parts that fail (F) are removed for subsequent repair.

At step 106, the battery assembly 10 is removed from the ACG and transferred to a shipping rack, from which it is taken to a vehicle assembly plant where the battery assembly is installed in a vehicle.

While certain embodiments of the present invention have been described in detail, those familiar with the art to which this invention relates will recognize various alternative designs and embodiments for practicing the invention as defined by the following claims.

What is claimed is:

1. A method of assembling a battery assembly, comprising the steps of:
    (a) forming battery packs, each pack including stacked battery cells and cooling passages extending along a length of the pack;
    (b) connecting terminals of each pack to a dc source and charging each pack to a desired state of charge;
    (c) installing battery packs on longitudinal and lateral surfaces of a tray located on an automatically guided cart that carries the battery assembly to locations where steps (d) through (g) are performed;
    (d) testing for fluid leaks in a cooling circuit comprising interconnected passages of each pack on the tray;
    (e) installing electric circuits in the assembly;
    (f) locating a cover over the battery packs and electric circuits; and
    (g) securing the cover to the tray such that positive and negative polarity terminals and the passages are accessible from outside the cover.

2. The method of claim 1, wherein step (a) further comprises testing the cooling passages of each pack for a fluid leak.

3. The method of claim 1, wherein step (b) further comprises verifying the state of charge of the pack by connecting the pack to an electric load.

4. The method of claim 1, wherein step (d) further comprises mutually interconnecting the passages of each pack located on the tray and connecting the passages to a bulkhead.

5. The method of claim 1, wherein step (e) further comprises routing low voltage and high voltage cables through the assembly.

6. The method of claim 1, wherein step (e) further comprises installing a fuse in the assembly.

7. The method of claim 1, wherein step (e) further comprises installing conductor cables and bus bars in the assembly.

8. The method of claim 1, wherein step (g) further comprises electrically testing the battery packs through the terminals accessible from outside the cover.

9. The method of claim 1, wherein step (g) further comprises conducting a pressure decay test of the fluid circuit by using air mass flow differential leak testing.

10. The method of claim 1 wherein step (g) further comprises performing a leak detection of a cover-tray interface using a helium spectrometer.

11. A method of assembling a battery assembly, comprising the steps of:
   (a) forming battery packs, each pack including battery cells and cooling passages extending along a length of the pack;
   (b) connecting terminals of each pack to a dc source and charging each pack to a desired state of charge;
   (c) installing battery packs on longitudinal and lateral surfaces of a tray located on an automatically guided cart;
   (d) using the cart to carry the battery assembly to locations where method steps (e) through (f) are performed;
   (e) testing for fluid leaks in a cooling circuit comprising interconnected passages of each pack on the tray; and
   (f) installing electric circuits in the assembly.

12. The method of claim 11, further comprising the step of (g) locating a cover over the battery packs and electric circuits and securing the cover to the tray.

13. The method of claim 11, wherein step (a) further comprises testing the cooling passages of each pack for a fluid leak.

14. The method of claim 11, wherein step (b) further comprises verifying the state of charge of the pack by connecting the pack to an electric load.

15. The method of claim 11, wherein step (e) further comprises mutually interconnecting the passages of each pack located on the tray and connecting the passages to a bulkhead.

16. The method of claim 11, wherein step (f) further comprises:
   routing low voltage and high voltage cables through the assembly;
   installing a fuse in the assembly; and
   installing conductor cables and bus bars in the assembly.

17. The method of claim 11, further comprising the steps of:
   securing the cover to the tray such that positive and negative polarity terminals and the passages are accessible from outside the cover; and
   (i) electrically testing the battery packs through the terminals accessible from outside the cover.

18. The method of claim 11 further comprising the steps of:
   (h) conducting a pressure decay test of the fluid circuit by using air mass flow differential leak testing; and
   (j) securing the cover to the tray and performing a leak detection of a cover-tray interface using a helium spectrometer.

\* \* \* \* \*